(12) United States Patent
Allen

(10) Patent No.: US 10,793,209 B2
(45) Date of Patent: Oct. 6, 2020

(54) HITCH ASSEMBLY

(71) Applicant: David E Allen, Tupelo, MS (US)

(72) Inventor: David E Allen, Tupelo, MS (US)

( * ) Notice: Subject to any disclaimer, the term of this patent is extended or adjusted under 35 U.S.C. 154(b) by 0 days.

(21) Appl. No.: 14/599,703

(22) Filed: Jan. 19, 2015

(65) Prior Publication Data

US 2020/0047830 A1    Feb. 13, 2020

(51) Int. Cl.
   *B62D 53/06* (2006.01)
   *B62D 53/08* (2006.01)

(52) U.S. Cl.
   CPC ................................. *B62D 53/0885* (2013.01)

(58) Field of Classification Search
   CPC ................................................. B62D 53/0885
   USPC ............................................. 280/438.1, 441
   See application file for complete search history.

(56) References Cited

U.S. PATENT DOCUMENTS

| | | | | |
|---|---|---|---|---|
| 2,958,542 A | * | 11/1960 | Janeway | B62D 53/0835 280/438.1 |
| 5,839,745 A | * | 11/1998 | Cattau | B62D 53/0807 280/434 |
| 6,957,823 B1 | * | 10/2005 | Allen | B62D 53/0871 280/438.1 |
| 2007/0290481 A1 | * | 12/2007 | Fisher | B62D 53/0814 280/438.1 |

* cited by examiner

*Primary Examiner* — Tony H Winner

(57) ABSTRACT

A hitch assembly, including a first frame for being attached to a tow vehicle and a second frame for being attached to a trailer. The second frame is movably engaged with the first frame and is adapted for fore and aft movement relative to the first frame along a plurality of ball bearings.

9 Claims, 6 Drawing Sheets

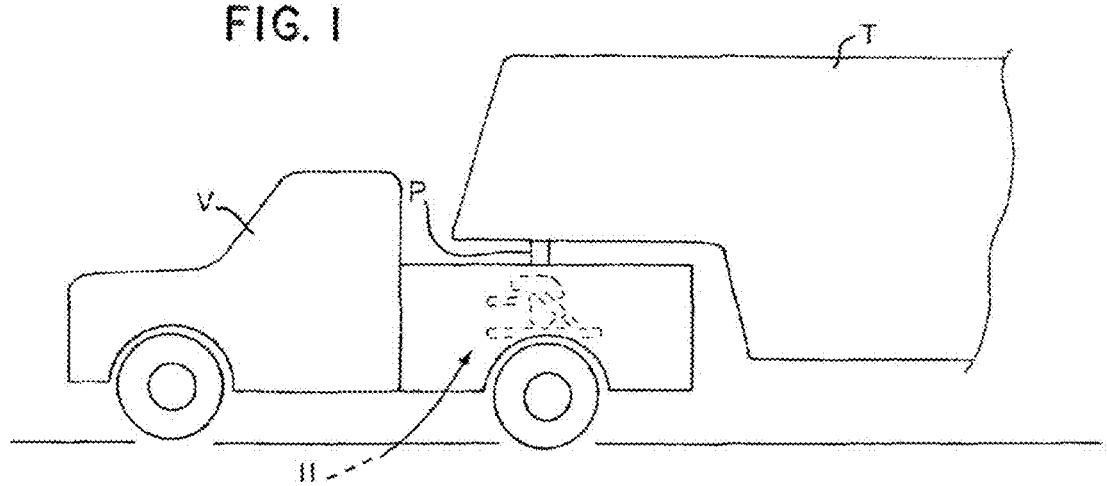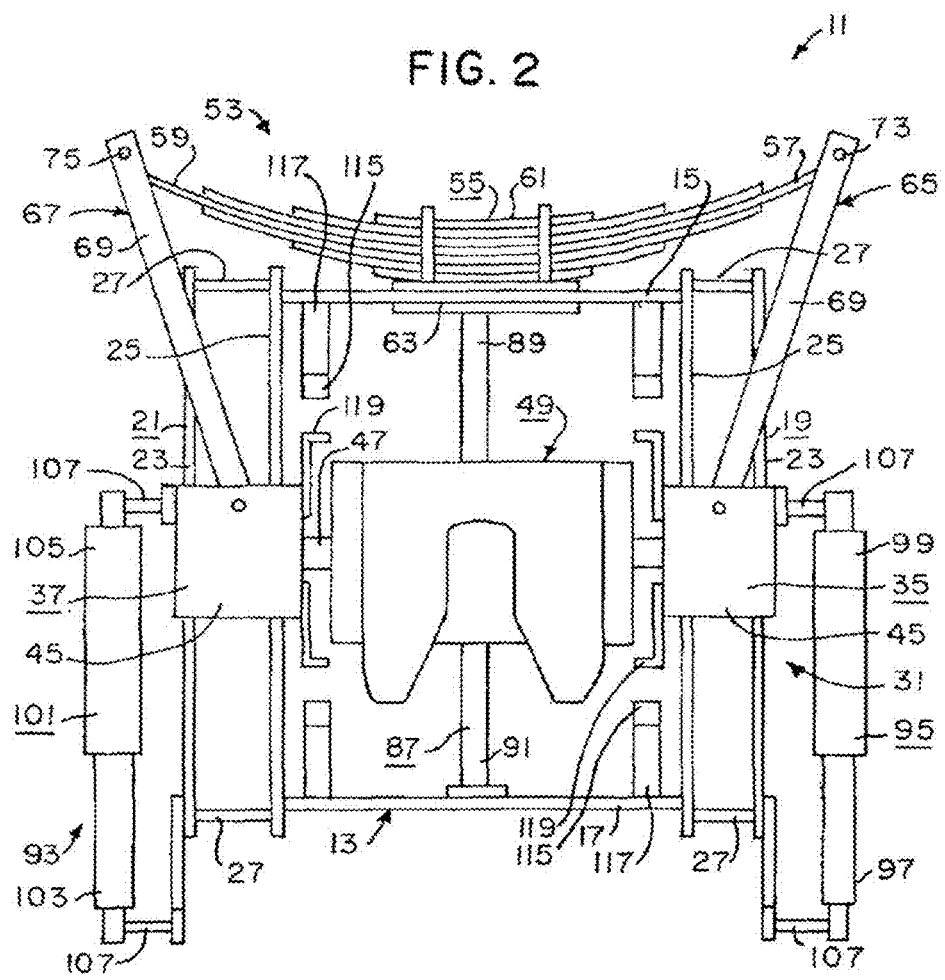

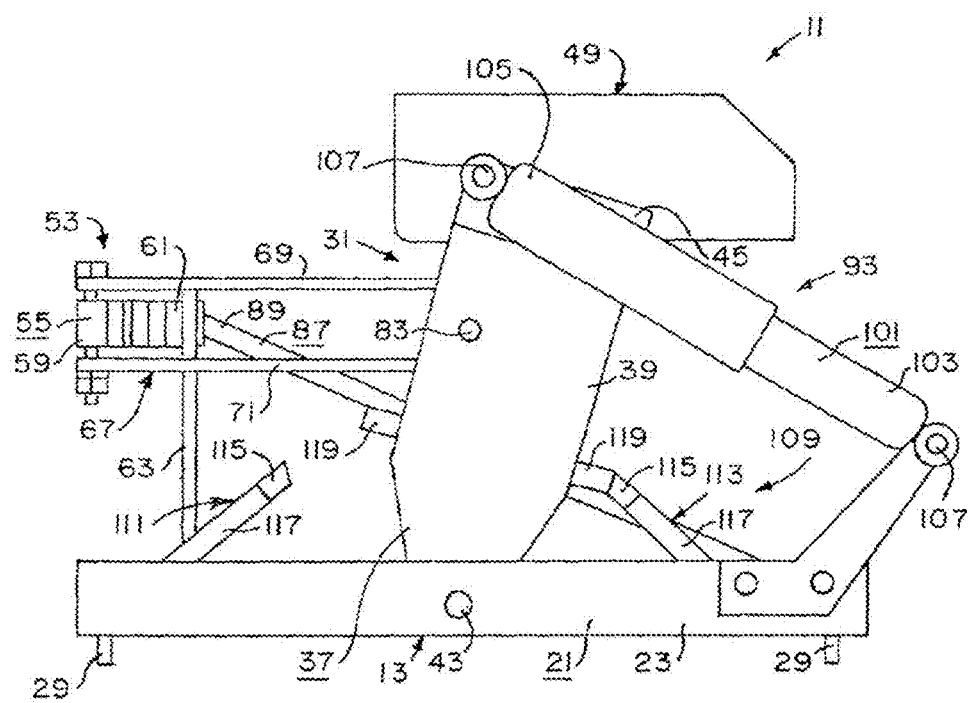
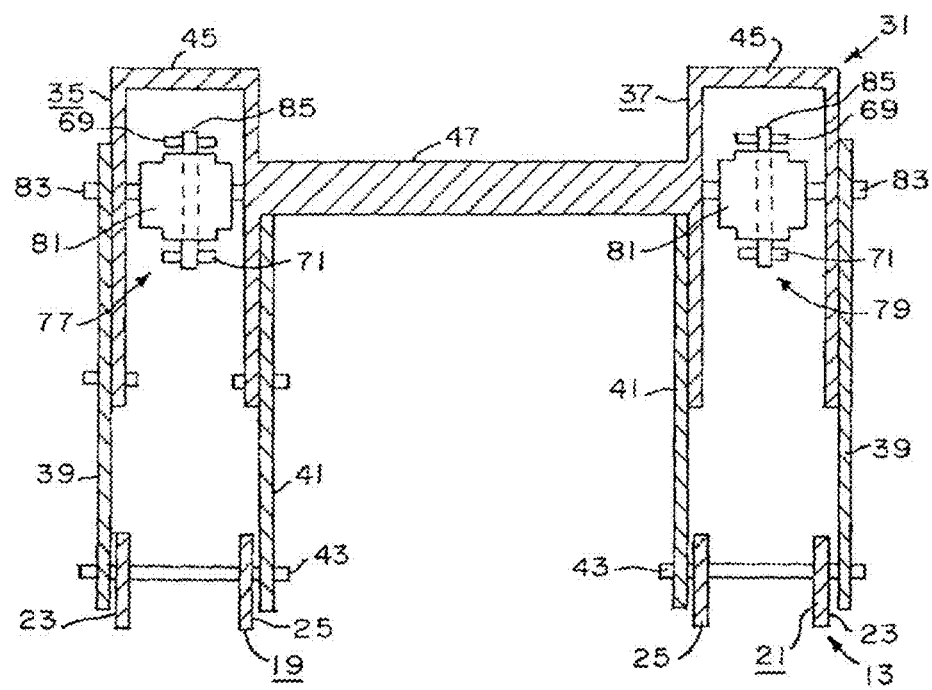

HITCH ASSEMBLY

TECHNICAL FIELD

The present invention relates to a hitch assembly for coupling a trailer to a tow vehicle and in particular, is directed to a hitch assembly with an improved design that simplifies construction and cost while at the same time providing improved performance.

Applicant's Reissued U.S. Pat. No. 6,957,823 introduced a new concept in fifth wheel recreational vehicle towing and was designed to minimize the unwanted and always annoying effects of "bucking and jerking" that are so common to conventional fifth wheel hitches.

A fifth wheel coupling commonly is used to couple a large trailer to a heavy-duty truck, commonly called an "18 wheeler." The coupling consists of a large diameter steel pin, called a kingpin, on the front of trailer in rotating engagement with a horseshoe-shaped coupling device, called a fifth wheel, on the rear of the tractor. The rotating engagement of the kingpin with the fifth wheel assembly facilitates turning of the tractor with the attached trailer.

The term "fifth wheel" related to the days of four-wheel horse-drawn carriages and wagons when a "fifth wheel" was mounted to allow the carriage to pivot in a horizontal plane to facilitate turning. Today, some recreational vehicles use a fifth wheel configuration where the coupling is in the bed of a pickup truck for towing a trailer.

When a tow vehicle and trailer are underway, constantly varying forces exert push and pull on the coupling between the tow vehicle and the trailer. This phenomenon is especially apparent on rough roads and subjects the driver and passengers to incessant bucking and jerking. On occasion, when the road is particularly rough, this effect is so strong that a reduction in speed is prudent in order to reduce the possibility of physical damage to the hitch and/or its mounting.

The hitch assembly disclosed in above-mentioned U.S. Pat. No. 6,957,823 easily accommodates the above-described forces by allowing approximately six inches of fore and aft movement between the tow vehicle and the trailer. The movement is controlled by leaf springs and is dampened by heavy-duty automotive shock absorbers.

Heavy rubber bumpers restrict the movement to the working limits of the hitch. The result is a surprising reduction of the annoying and sometimes destructive forces so common to the conventional hitch.

The present invention improves upon the prior design by providing a hitch assembly that is simpler to construct, less expensive and provides improved performance.

BRIEF DESCRIPTION OF THE DRAWINGS

The novel features of the present invention are set out with particularity in the appended claims, but the invention will be understood more fully and clearly from the following detailed description of the invention as set forth in the accompanying drawings in which:

FIG. 1 is a diagrammatic side elevation view of a prior hitch assembly shown in combination with a tow vehicle and a trailer;

FIG. 2 is top plan view of the prior hitch assembly;

FIG. 5 is a diagrammatic side elevation view of the prior hitch assembly shown in an aft position;

FIG. 6 is a somewhat diagrammatic sectional view substantially as taken on line 6-6 of FIG. 3 with portions omitted for clarity;

DESCRIPTION OF THE PREFERRED EMBODIMENT

Figure 3:
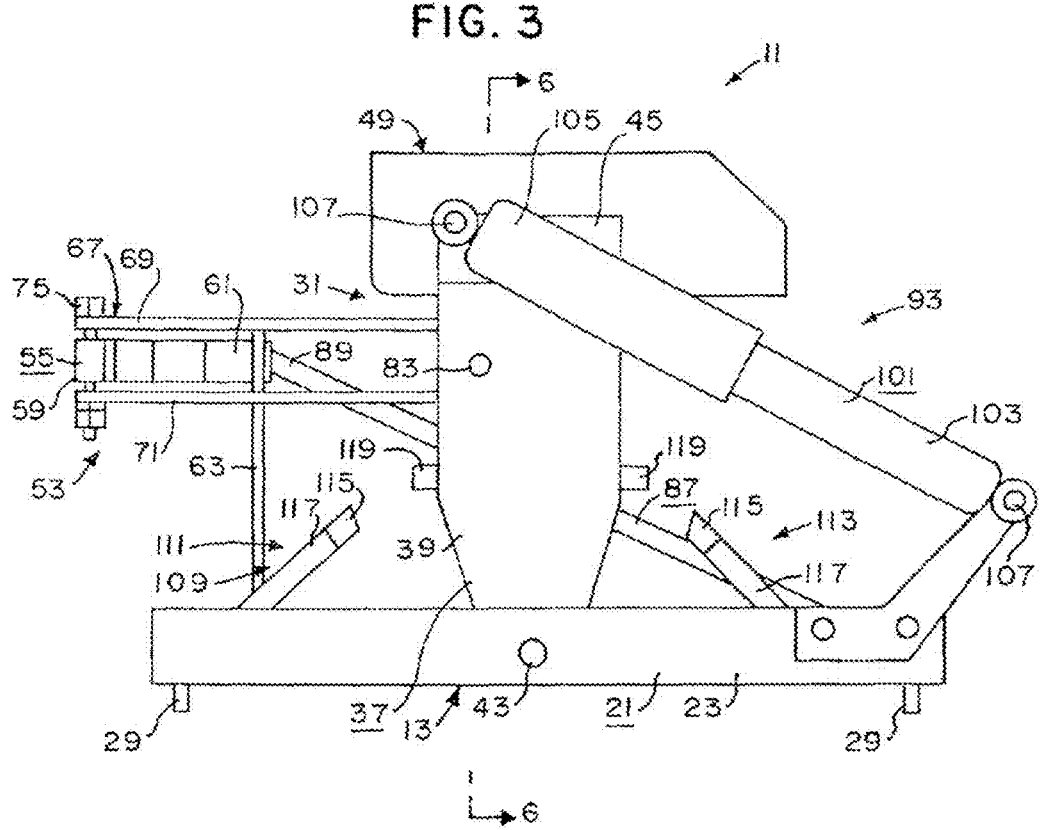
FIG. 3 is a diagrammatic side elevation view of the prior hitch assembly shown in a neutral position.
Figure 4:
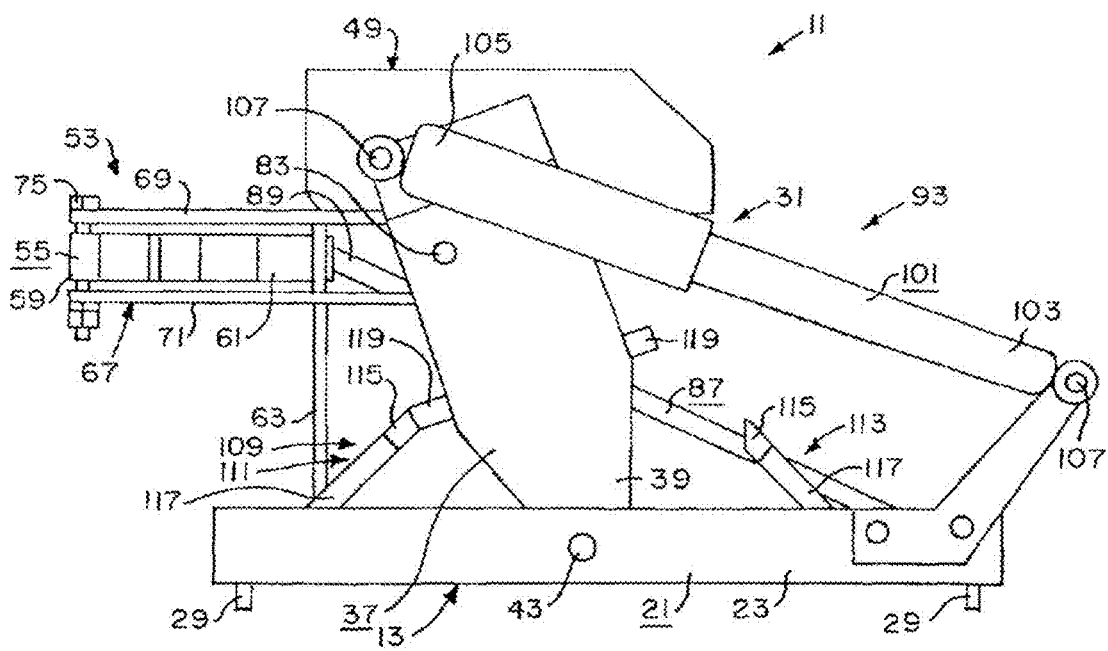
FIG. 4 is a diagrammatic side elevation view of the prior hitch assembly shown in a fore position.

A preferred embodiment of the prior hitch assembly is shown in FIGS. 1-6 and is identified by numeral 11. The hitch assembly 11 is used to couple a trailer T to a tow vehicle V in a manner that allows fore and aft, spring controlled and shock dampened, movement between the trailer T and tow vehicle V with a significant reduction in bucking and jerking being felt by the driver and passengers that is common in conventional hitches.

The hitch assembly 11 includes a frame 13 for attachment to the tow vehicle V. The frame 13 preferably consists of an open structure including a front crosspiece 15, a rear crosspiece 17, a right side construct 19 extending between the right ends of the front and rear crosspieces 15, 17 and a left side construct 21 extending between the left ends of the front and rear crosspieces 15, 17.

Each side construct 19, 21 preferably includes an outer rail 23 and an inner rail 25 extending parallel to and spaced apart from one another, and joined together at opposite ends with end crosspieces 27.

Lugs 29 are provided along the crosspieces 17, 19, 27, etc., to allow the frame 13 to be fixed solidly and immovably to the tow vehicle V, e.g., to the chassis of the tow vehicle V, by bolts or the like (not shown).

The frame 13 may be constructed in various sizes and out of various materials as will now be apparent to those skilled in the art. Thus, for example, the various pieces of the frame 13 may be constructed out of standard steel structural members, cut or otherwise formed to the desired shape, and welded, bolted, or otherwise joined together to form a strong framework as will be apparent to those skilled in the art.

The hitch assembly 11 includes a cradle assembly 31 pivotally attached to the frame 13. The cradle assembly 31 includes a right side cradle leg, or cradle leg construct, 35 pivotally attaching the right side of the cradle assembly 31 to the right side of the frame 13. Similarly, the hitch assembly 11 includes a left side cradle leg, or cradle leg construct, 37 pivotally attaching the left side of the cradle assembly 31 to the left side of the frame 13.

Preferably, each cradle leg 35, 37 includes an outer leg 39 and an inner leg 41 extending parallel to and spaced apart from one another, and pivotally attached at the lower ends thereof to the outer and inner rails 23, 25 of the respective right and left side constructs 19, 21 of the frame 13 by way of respective right and left pivot bolts 43 or the like.

Each cradle leg 35, 37 may have a U-shaped member 45 attached to and joining the upper ends of each respective sets of outer and inner legs 39, 41. The components of each cradle leg 35, 37 are preferably joined together by bolts or the like to allow cradle height adjustment between, for example, the legs 39, 41 and the U-shaped member 45 as clearly illustrated in FIG. 6 and as will be apparent to those skilled in the art.

The cradle assembly 31 preferably includes a transverse body member 65 or bar 47 extending between and joining the U-shaped member 45, etc., of the cradle legs 35, 37.

Thus, bar 47 permanently joins the right and left side cradle leg constructs, or segments 35, 37, of the assembly cradle 31. The cradle assembly 31 may be constructed in various sizes and out of various materials as will be apparent to those skilled in the art. Thus, for example, the various pieces of the cradle assembly 31 may be constructed separately out of standard steel structural members, cut or otherwise formed to the desired shape, and welded, bolted, or otherwise joined together to form a strong construct.

Alternatively, all or part of the cradle assembly 31, may be constructed as an integral one-piece unit (thus, for example, the U-shaped members 45 and the bar 47 may be constructed as a one-piece unit as shown in FIG. 6), as will be apparent to those skilled in the art.

The hitch assembly 11 includes a hitch receiver 49 mounted to the cradle assembly 31. The hitch receiver 49 is preferably a typical fifth wheel hitch receiver of any standard construction and operation well known to those skilled in the art for accepting and locking onto the hitch pin P of the trailer T via a handle-operated locking mechanism or the like (not shown), to thereby hitch the trailer T to the hitch assembly 11 and, thus, the tow vehicle V.

The hitch receiver 49 may be attached to the cradle assembly 31 in the typical manner, commonly at two points, and will pivot with the cradle assembly 31 relative to the frame 13, as will be apparent to those skilled in the art.

A typical fifth wheel hitch receiver of the type that can be used for the hitch receiver 49 is disclosed as "saddle 64" in Lange, U.S. Pat. No. 6,581,951, issued Jun. 24, 2003, and is incorporated herein by reference.

The hitch assembly 11 includes fore spring or leaf spring 53 between the cradle assembly 31 and the front of the frame 13 for controlling fore and aft movement of the cradle assembly 31. The leaf spring means 53 preferably includes a standard leaf spring 55 composed of multiple layers (leaves) of elongated spring metal bracketed together, and having a first or right end 57, a second or left end 59, and a mid-portion 61.

The mid-portion 61 of the leaf spring 55 is preferably attached to the front crosspiece 15 of the frame 13 by way of a spring mounting plate 63 having a lower end bolted or otherwise attached to the mid-portion of the front crosspiece 15 and having an upper end bolted (via U-bolts) or otherwise attached to the mid-portion 61 of the leaf spring 55.

The right end 57 of the leaf spring 55 is preferably attached to the right side cradle leg construct 35 by way of a right cradle/spring control rod construct 65, while the left end 59 of the leaf spring 55 is preferably attached to the left side cradle leg construct 37 by way of a left cradle/spring control rod construct 67.

Each cradle/spring control rod construct 65, 67 preferably includes an elongated upper cradle-spring control rod or arm 69 and an elongated lower cradle-spring control rod or arm 71 extending between the respective left and right ends 57, 59 of the leaf spring 55 and the respective right and left side cradle leg constructs 35, 37. Each cradle-spring control rod 69, 71 are preferably identical to one another.

A right leaf spring end bolt 73 is preferably used to join the front ends of the upper and lower cradle spring control rods 69, 71 of the right cradle/spring control rod construct 65 to the respective upper and lower sides of the right end 57 of the leaf spring 55 with the upper and lower cradle-spring control rods 69, 71 spaced apart and parallel to one another.

Likewise, a left leaf spring end bolt 75 is preferably used to join the front ends of the upper and lower cradle-spring control rods 69, 71 of the left cradle/spring control rod construct 67 to the respective upper and lower sides of the left end 59 of the leaf spring 55 with the upper and lower cradle-spring control rods 69, 71 spaced apart and parallel to one another.

The bolts 73, 75 are snug but not tight, thus allowing free movement of the respective right and left ends 57, 59 of the leaf spring 55. Right and left flexible couplings 77, 79 are preferably provided for joining the rear ends of the upper and lower cradle-spring control rods 69, 71 of the respective right and left cradle/spring control rod constructs 65, 67 to the respective right and left side cradle leg constructs 35, 37 of the cradle assembly 31.

Each flexible coupling 77, 79 preferably includes a body member 81 mounted in a rotatable manner to the respective right and left side cradle leg constructs 35, 37 by way of a horizontally mounted bolt 83, the bolt 83 being snug but not tight, thus allowing the body member 81 to rotate about the bolt 83; and mounted in a rotatable manner to the rear ends of the upper and lower cradle-spring control rods 69, 71 of the respective right and left cradle-spring control rod constructs 65, 67 by a vertically mounted bolt 85, the bolt 85 being snug but not tight, thus allowing the rear ends of the upper and lower cradle spring control rods 69, 71 to rotate about the bolt 85.

The flexible couplings 77, 79 are U joints, which allow for minor movement of the rear ends of the cradle-spring control rods 69, 71 in both the vertical and horizontal planes.

Body member 81 rotates about bolt 83, but not bolt 85. The hitch assembly 11 preferably includes a thrust bar 87 mounted between the frame 13 and the leaf spring 55 to help fixedly mount the leaf spring 55 to the frame 13.

The thrust bar 87 preferably consists of a strong, rigid, elongated bar having a first or front end 89 attached to the mid portion 61 of the leaf spring 55 or the upper end of the spring mounting plate 63, and a second or rear end 91 attached to the mid-portion of the rear crosspiece 17 of the frame 13 to absorb thrust forces created by movement of the cradle assembly 31 against the leaf spring 53.

The hitch assembly includes an aft spring, or shock absorber 93 for dampening sudden and rapid motion of the cradle assembly 31 about the pivot bolts 43. The shock absorber 93 preferably includes a first or right side shock absorber 95 having a first or lower end 97 mounted to the rear end of frame 13 and a second or upper end 99 mounted to the cradle assembly 31. The shock absorber 93 preferably includes a second or left side shock absorber 101 having a first or lower end 103 mounted to the rear end of frame 13 and a second or upper end 105 mounted to the cradle assembly 31.

The shock absorbers 95, 101 may be conventional, heavy duty automotive or truck shock absorbers well known to those skilled in the art, mounted to the respective portions of the frame 13 and cradle assembly 31 via pivot bolts 107 or the like.

The hitch assembly 11 preferably includes stop 109 for limiting the fore and aft movement of the cradle assembly 31. The stop 109 preferably includes front stop 111 for limiting the fore movement of the cradle assembly 31 to approximately 15°, and rear stop means 113 for limiting the aft movement of the cradle assembly 31 to approximately 15°, thus allowing a total fore and aft movement of the cradle assembly 31 of approximately 30° about the pivot bolts 43.

Each of stops 111, 113 preferably includes a pair of rubber bumpers 115 attached to the frame 13 via a bracket 117 or the like, with one bumper 115 on the right side of the frame 13 and the other bumper 115 on the left side of the frame 13.

Further, each stop 111, 113 preferably includes a pair of bumper stops 119 attached to the cradle assembly 31 in proper locations to engage respective ones of the rubber bumpers 115 when the cradle assembly 31 moves fore or aft the desired maximum amount (e.g., 15° fore or aft).

To use the hitch assembly 11, the frame 13 is attached to the tow vehicle V via lugs 29 or the like. The receiver 49 rests upon the cradle assembly 31, but is not rigidly affixed thereof as will be apparent to those skilled in the art. The trailer T is connected to the receiver 49 in any conventional manner (i.e., by backing the tow vehicle V under the hitch pin P of the trailer T so that the hitch P engages the receiver 49 and can be locked to the receiver 49 via the handle-operated locking mechanism, etc.

The receiver 49 is the only point of contact between the tow vehicle V and the trailer T. Disparate forces between the tow vehicle V and the trailer T are exerted at the receiver 49 and, thence, by way of its mounting, to the cradle assembly 31, causing the cradle assembly 31 to rotate about the pivot bolts 43 in a fore or aft direction, activating the leaf spring means 53 and the shock absorber means 93. The rotational movement of the cradle assembly 31 is transmitted by way of the flexible couplings 77, 79 and cradle spring control rod constructs 65, 67 to linear movement of the ends 57, 59 of the leaf spring 55.

The leaf spring 55, by design, resists the movement of the cradle assembly 31, always attempting to return the cradle assembly 31 to a mid-point or neutral position. In operation (i.e., when towing the trailer T), unwanted forces such as those caused by routine traverse of potholes, roadway cross strips, bridge abutments and rail crossings, constantly batter the trailer hitch pin P and hitch receiver 49.

Normally, the adverse effects of such action results in wear and tear involving the entire towing operation including the trailer T and its contents, the tow vehicle V and its contents and occupants, and the hitch assembly itself. The hitch assembly 11 accommodates these unwanted forces in a simple and straightforward way by allowing up to six inches of free, virtually frictionless movement between the trailer and tow vehicle.

The measure of displacement of the receiver 49 at any given instant is directly proportional to the disparity of the forces involved, controlled by the leaf spring means 53, the shock absorber means 93, and, at the extreme limits of allowable movement, the rubber bumpers 115.

Figure 7:
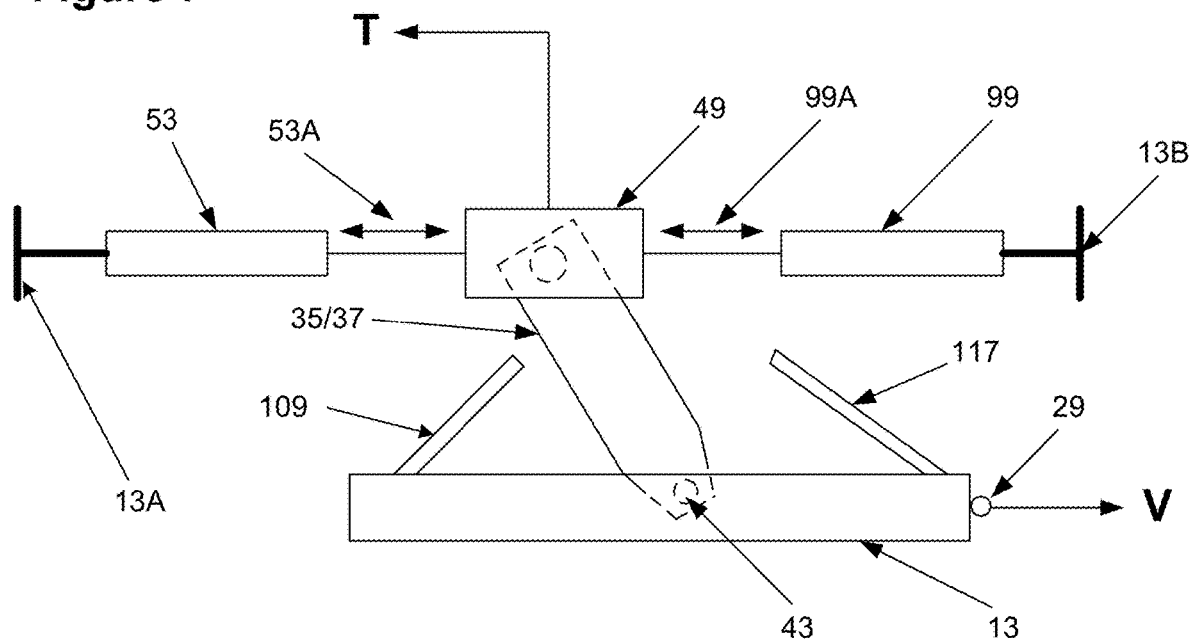
FIG. 7 is a mechanical block diagram of one embodiment of the prior hitch assembly.

FIG. 7 is a simplified mechanical diagram of the hitch assembly illustrated in FIGS. 1-6. As shown in FIG. 7, reference number 13 is the frame, which attaches to the tow vehicle V via a plurality of lugs 29.

Hitch receiver 49 is pivotally connected to frame 13 by a pivot bolt 43 via cradle legs 35, 37. Pivot bolt 43 allows hitch receiver 49 to have the approximately six inches of fore and aft movement between the tow vehicle and the trailer as indicated by arrows 53A and 99A. The angular travel of cradle legs 35, 37 is limited by hard stops 109 and 117 as described above.

Hitch receiver 49 permits the assembly to be coupled to a trailer T.

One side of hitch receiver 49 is connected to one end of leaf spring 53. The other end of leaf spring 53 is connected to a stationary part of frame 13 as indicated by reference number 13A. The other side of hitch receiver 49 is coupled to one end of shock absorber 99. The other end of shock absorber 99 is connected to a stationary part of frame 13 as indicated by reference number 13B.

Leaf springs 53 and shock absorber 99 absorb and dampens a great deal of the bucking and jerking motion that would otherwise be imparted to the vehicle driver and passengers. As the bucking and jerking motion occurs, the pivotal connection between hitch receiver 49 and frame 13 allows the fore and aft movement of hitch receiver, as indicated by arrows 53A and 99A to remain relatively level.

Figure 8:
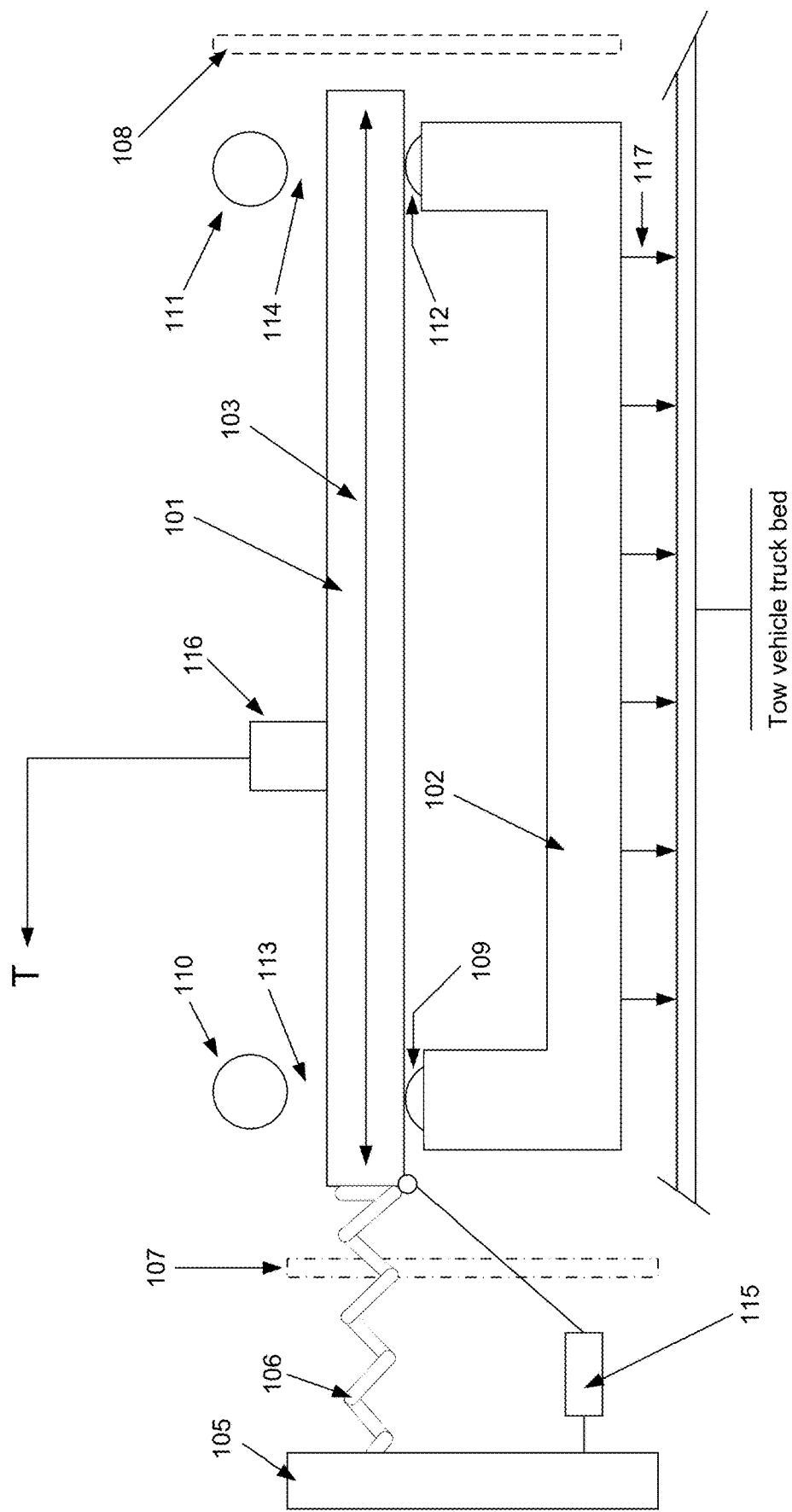
FIG. 8 is a mechanical block diagram of one embodiment of an improved hitch assembly according to the present invention.

FIG. 8 is a simplified mechanical diagram showing one embodiment of an improved hitch assembly in accordance with the present invention.

As shown in FIG. 8, the improved hitch assembly includes movable assembly 101 and fixed assembly 102. Movable assembly 101 moves fore and aft relative to fixed assembly 102 as indicated by arrow 103. Assembly 101 is coupled to a fixed frame 105 by a coil spring 106. Thus, as assembly 101 moves fore and aft relative to assembly 102, coil spring 106 extends and contracts accordingly.

A shock absorber 115 attached to movable assembly 101 also serves to dampen fore-aft movement of assembly 101.

Fixed assembly 102 is rigidly attached to, e.g., the bed of, the tow vehicle as indicated by the plurality of arrows 117 as one of ordinary skill in the art would know how to achieve.

The movement of assembly 101 is maintained in a generally straight direction relative to assembly 102 by a plurality of bearings 110-111. As illustrated in FIG. 8, the bottom surface of assembly 101 rides along bearings 109 and 112. The upper surface of assembly 101 is ideally separated from bearings 110 and 111 by air gaps 113 and 114 of approximately $\frac{1}{16}^{th}$ of an inch. However, when the hitch is in operation towing a vehicle, the normal bucking and jerking action described above will on occasion cause assembly 101 to briefly engage one or both of bearings 110 and 111.

Assembly 101 is attached to the trailer by a hitch receiver 116 which can be of the same type as hitch 49 illustrated in FIG. 2. Assembly 102 is attached to a mount 117 which can be used to attach the assembly 101 to the truck chassis.

As the trailer is towed, the natural bucking and jerking motion that otherwise would be felt by the vehicle driver is greatly absorbed by the controlled movement of assembly 101 along arrow 103.

Figure 9:
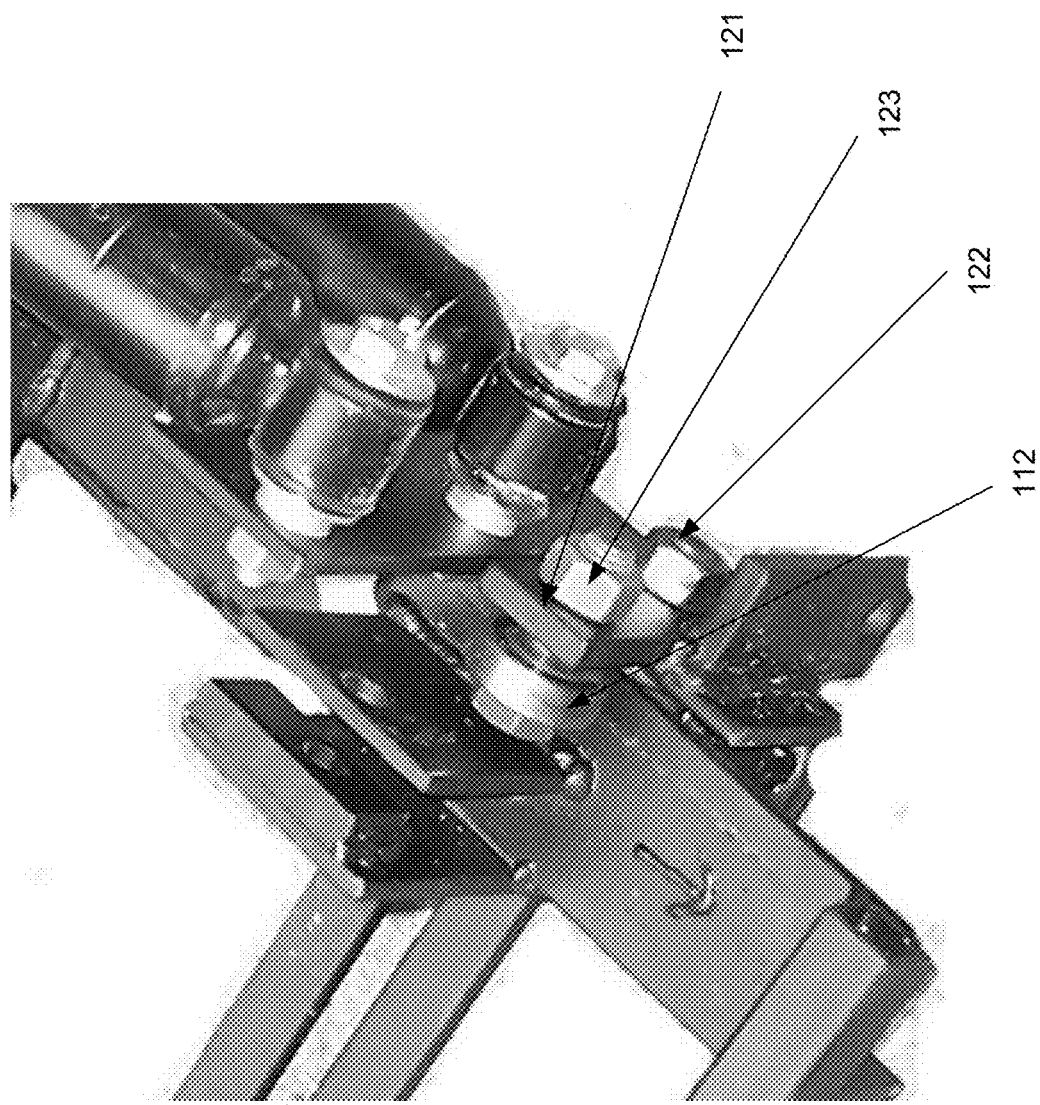
FIG. 9 is a close up view of a portion of an improved hitch assembly showing the construction of the roller bearing.

FIG. 9 illustrated bearing 112 in more detail.

As shown in FIG. 9, bearing 112 is a circular roller bearing as is known in the art. The bearing is attached to a mounting bracket 121 by a nut and bolt 122 and 123 as one of ordinary skill in the art would know how to do. The remaining plurality of upper bearings are mounted and attached in a similar manner.

With reference again to FIG. 8, one can readily see the tightly limited up and down and fore and aft movement of the assembly 116

The important elements of the hitch of the present invention are control of fore and aft movement using shock absorbers 115, coil springs 106 and the roller bearings 109-112. The shock absorbers should be mounted horizontally, or as close to horizontal as possible, and be as low as the design will allow.

While the foregoing specification teaches the principles of the present invention, with examples provided for the purpose of illustration, it will be appreciated by one skilled in the art from reading this disclosure that various changes in form and detail can be made without departing from the true scope of the invention.

I claim:

1. A hitch assembly for coupling a trailer to a tow vehicle, said hitch assembly comprising:
    a first frame for being attached to said tow vehicle;
    a second frame for being attached to said trailer and being movably engaged with said first frame, said second frame adapted for fore and aft movement relative to said first frame along a plurality of roller bearings within a predetermined range when said tow vehicle is towing said trailer.

2. The hitch assembly of claim 1, further comprising a coil spring, wherein one end of said coil spring is attached to said second frame and the other end of said coil spring is attached to said tow vehicle for limiting said fore and aft movement to said predetermined range.

3. The hitch assembly of claim 2, further comprising a shock absorber, wherein one end of said shock absorber is attached to said second frame and the other end of said shock absorber is attached to said tow vehicle for limiting said fore and aft movement to said predetermine range.

4. The hitch assembly of claim 3, further comprising a second plurality of roller bearings, said second plurality of roller bearings being adapted for maintaining the movement of said second frame to a generally straight direction relative to said first frame, wherein said plurality of roller bearings and said second plurality of roller bearing cooperating to limit vertical movement of said second frame to a predetermined amount.

5. The hitch assembly of claim 1, further comprising a second plurality of roller bearings, said second plurality of roller bearings being adapted for maintaining the movement of said second frame to a generally straight direction relative to said first frame.

6. The hitch assembly of claim 5, wherein said plurality of roller bearings and said second plurality of roller bearing cooperating to limit vertical movement of said second frame to a predetermined amount.

7. The hitch assembly of claim 1, wherein first frame is rigidly attached to said vehicle.

8. The hitch assembly of claim 1, wherein second frame is rigidly attached to said trailer.

9. The hitch assembly of claim 1, further comprising a shock absorber, wherein one end of said shock absorber is attached to said second frame and the other end of said shock absorber is attached to said tow vehicle for limiting said fore and aft movement to said predetermined range.

* * * * *